Feb. 1, 1966   F. T. COX, JR., ETAL   3,232,175
BRAKE SYSTEMS
Filed April 24, 1963   3 Sheets-Sheet 1

INVENTORS
Frank T. Cox, Jr.
Howard A. Sherretts
George P. Mathews
BY
Strauch, Nolan & Neale
ATTORNEYS

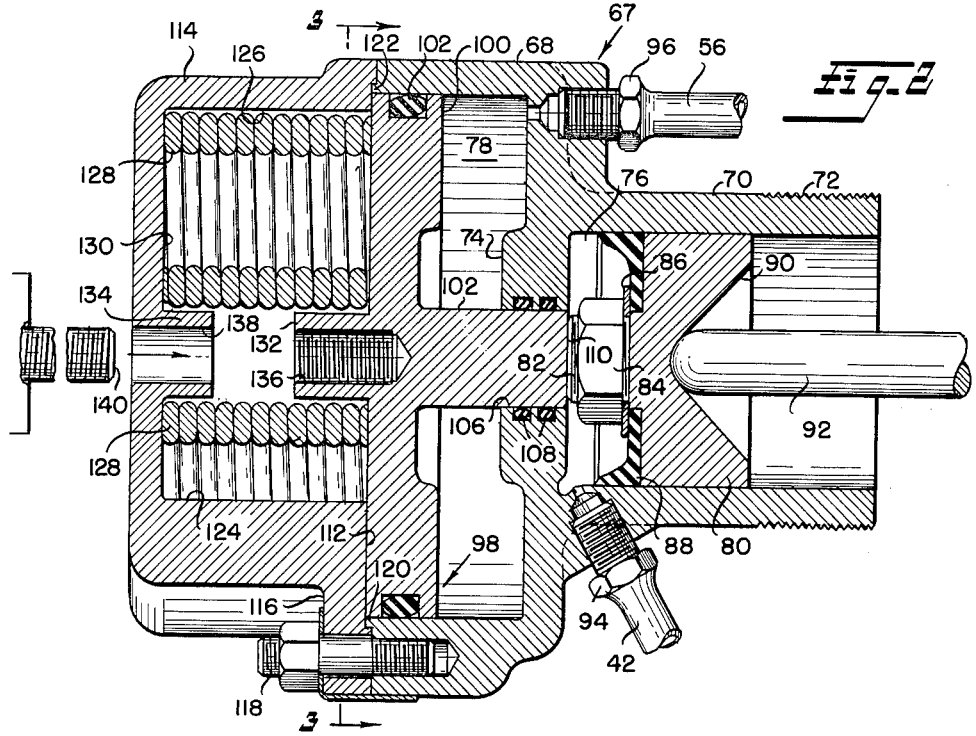
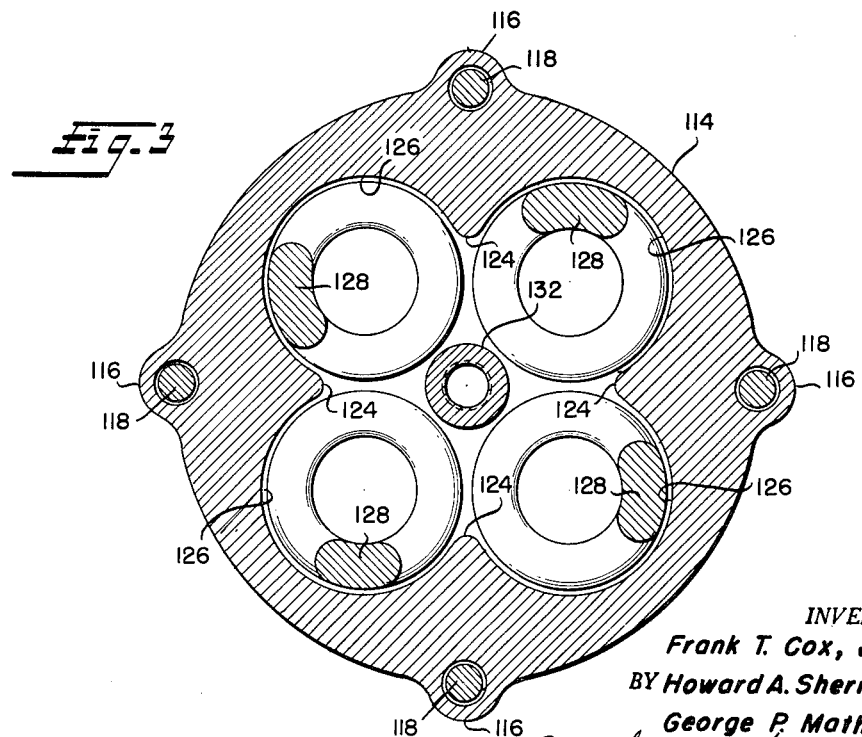

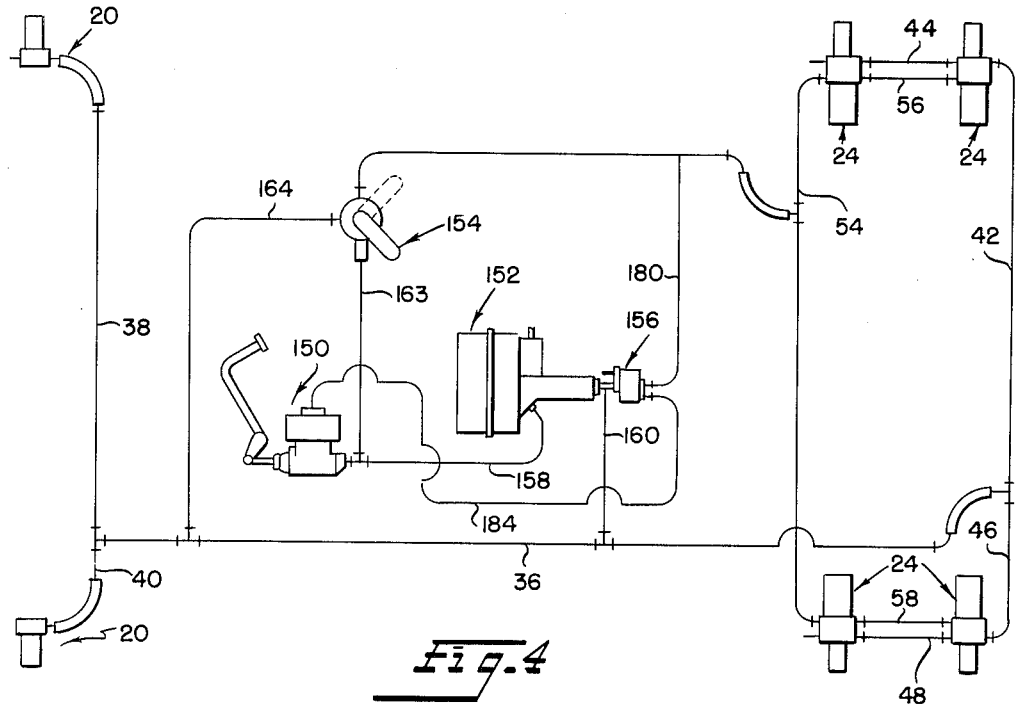
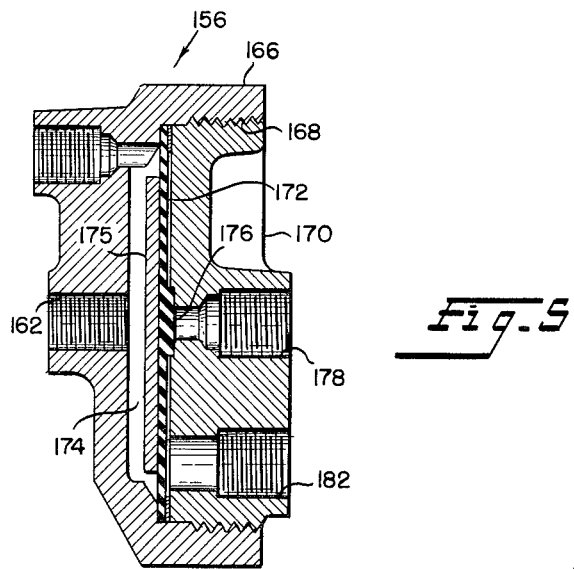

United States Patent Office 3,232,175
Patented Feb. 1, 1966

3,232,175
BRAKE SYSTEMS
Frank T. Cox, Jr., Ashtabula, Ohio, Howard A. Sherretts, Linesville, Pa., and George P. Mathews, Ashtabula, Ohio, assignors, by mesne assignments, to Rockwell-Standard Corporation, a corporation of Delaware
Filed Apr. 24, 1963, Ser. No. 275,375
5 Claims. (Cl. 91—170)

The present invention relates to brake systems and more particularly to combined service and emergency brake systems particularly suited for actuation by hydraulic fluid.

Emergency brake actuators for motor vehicles are known which comprise a pressure chamber, piston and spring means which, in normal operation, are held in a released position by the pressure in the service brake system. When the pressure in the normal service brake system drops below a certain value because of a leak or for other reasons a compressed spring expands and acts on the service brake pushrod to actuate the brakes. These prior devices are usually attached well outside the brake drum and directly on or in the vicinity of the service brake actuator and both actuators are attached by brackets to the vehicle axle in position to actuate a pushrod connected to a brake lever or slack adjuster to rotate a brake cam shaft.

Modern vehicle design and design of chassis for special vehicles make it imperative to reduce the overall space needed for the brake actuating mechanisms. Recently, fluid brake actuating mechanisms have been developed which act on the brake shoes essentially directly without a rotating cam shaft and brake lever. An example of such a mechanism is disclosed in United States Patent 3,037,584 owned by applicants' assignee. In this or similar brake mechanisms the brake actuator is attached directly to the brake support and may be well within the brake drum. Because of the limited space available in such structures the large and bulky prior emergency brake actuators cannot be accommodated. The space limitation is even more severe in hydraulic brake actuators which are usually much smaller than pneumatic actuators. Thus, the prior devices designed for air actuation cannot be incorporated in hydraulic systems.

Further, to achieve effective emergency brake application particularly in heavy duty vehicles a relatively large powerful spring must be employed which further increases the size of the emergency actuator.

With these considerations in mind it is a principal purpose and object of the present invention to provide novel emergency brake systems including an actuator mechanism which is particularly suitable for use with hydraulic brake actuators and which is attached to the hydraulic cylinder to provide a relatively small compact integral unit which may be readily accommodated within the restricted spaces available in such systems.

It is another object of the present invention to provide improved hydraulic brake actuating cylinders having an apertured end wall from which a cup shaped member extends to form the pressure chamber of an integral emergency actuator and having a separate cup shaped cover attached to the cup shaped member to form a closed chamber therewith.

It is a further object of the present invention to provide in an emergency brake actuator mechanism an enclosure, a piston in said enclosure which has a radial flange dividing the enclosure into a hydraulic pressure chamber and a mechanical pressure chamber, the mechanical pressure chamber being provided with spring means which act on the piston in a direction to effect emergency application of the brakes.

A further object resides in the provision of a combined hydraulic mechanical emergency brake actuator provided with energy storing means which comprise a number of separate coil springs having identical spring rates and which are adapted to act as a unit.

This novel arrangement of separate actuator springs in an emergency brake chamber instead of one large spring or two or three springs nested within each other permits a substantial reduction in the size of the emergency brake chamber. This arrangement makes it possible to effectively vary the brake application power to suit the requirements of different installations by varying the number of springs in the unit without changing the size of the chamber.

A further object is to provide in an emergency brake actuator, an actuator piston in a chamber closed by a removable cap, a set of powerful springs between the cap and the piston and means for locking the piston to the cap with the springs compressed between the cap and the piston to thus permit installation and removal of the cap, springs and piston as a unit.

It is also an object of the present invention to provide improved brake systems including emergency brakes which are applied automatically upon failure of the service brakes and which may be applied or released manually as desired.

It is an additional object of the invention to provide novel hydraulic brake systems of the so-called full power type or of the vacuum boost type incorporating automatic or manually operated emergency brakes.

Other objects and novel features will become apparent from the following detailed description in connection with the appended drawings in which:

FIGURE 2 is a longitudinal central section through the combined emergency and service brake unit of the present invention;

FIGURE 3 is a transverse section through the emergency chamber taken along line 3—3 of FIGURE 2;

FIGURE 4 is a diagrammatic illustration of a modified brake control system incorporating the brake mechanism shown in FIGURES 2 and 3; and FIGURE 5 is an enlarged central section of one component of the system of FIGURE 4.

Figure 1:
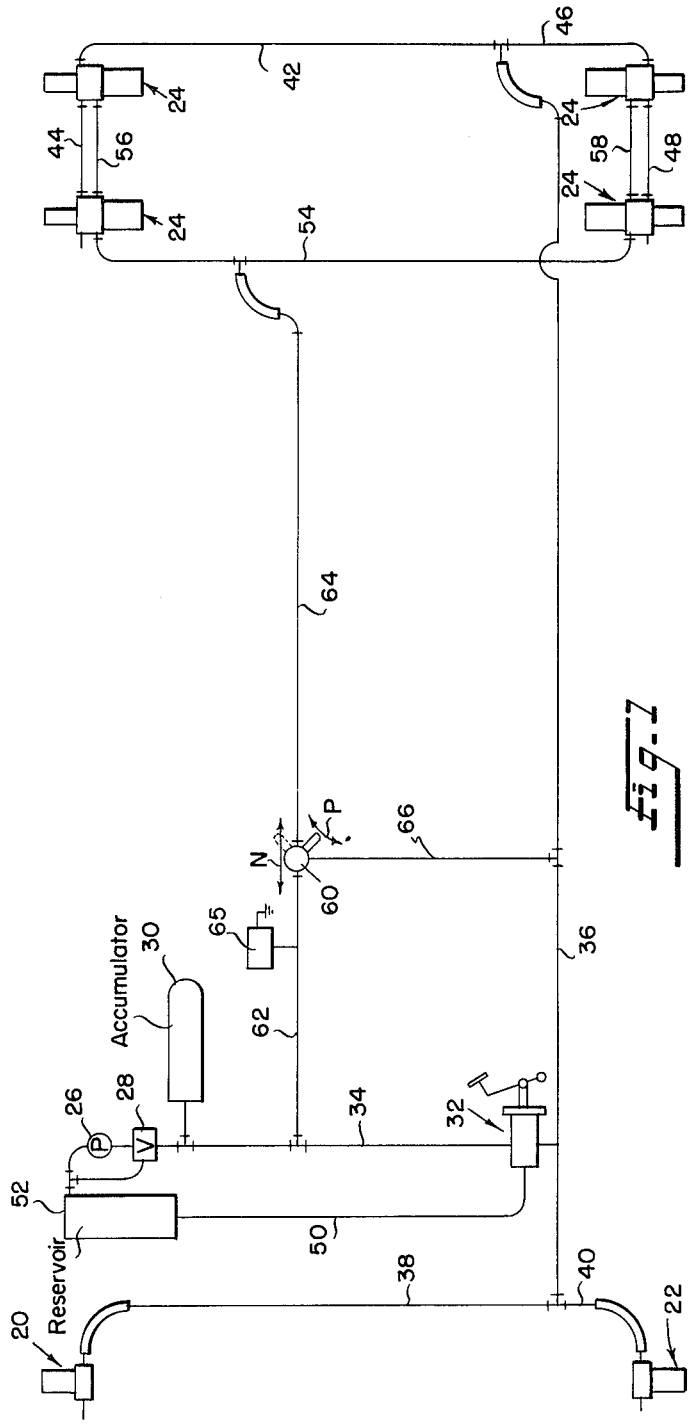
FIGURE 1 is a diagrammatic illustration of one form of improved brake system of the present invention showing both the normal service brake and the emergency brake.

FIGURE 1, to which detailed reference will now be made, illustrates diagrammatically the combined normal service brake system and the emergency brake system as applied to a truck having a pair of front wheel brake actuator assemblies indicated generally at 20 and 22 which are of conventional construction and dual rear brake units each comprising identical actuator assemblies 24 which are shown in detail in FIGURES 2 and 3 and will be described below. Each of these units may be associated with the brake assemblies, which have been omitted for clarity, in the manner disclosed for example, in United States Patent No. 3,037,584.

The system shown in FIGURE 1 is the full power hydraulic type in which the pressure is developed in the system by a pump 26 which may be driven by the vehicle engine or by an electric motor. The output side of the pump 26 is connected through a conventional by-pass relief and check valve assembly 28 to an accumulator 30, these components being effective to deliver hydraulic fluid under predetermined pressure to the inlet side of the usual pedal operated brake valve assembly 32. This unit is a commercially available item and is effective to meter fluid under pressure from the main pressure line 34 to the main brake service line 36 connected to the front brake actuators 20 and 22 by branch lines 38 and 40, respectively, and connected to the rear brake actuator assemblies 24 through branch lines 42, 44, 46 and 48. Thus, operation of the valve 32 simultaneously supplies hydraulic fluid under controlled pressure to each of the brake actuator assemblies, the valve 32 being so arranged that when it is returned to its off position the main brake line 36 is connected through the valve and a line 50 to a reservoir 52. The brakes are released by a suitable return spring which is of wholly conventional construction.

As explained in detail below the emergency brake actuators are so constructed that they are applied by heavy spring pressure and are released by the application of hydraulic pressure applied to the units through lines 54, 56 and 58.

A conventional commercially available valve assembly 60 is effective in its normal position to connect a high pressure line 62 to the line 54 through a line 64 and in a second or "park" position to connect the line 64 to the service brake line 36 through a branch line 66. The construction of valve 60 is such that it is spring urged to the "park" position but is held in its normal position by system pressure above a preset level.

The valve 60 may be moved manually to its park position to connect the emergency actuators to the reservoir through the lines 64, 66, 36, the brake valve 32, and the line 50 to permit the application of the emergency brakes.

The system also includes a low pressure warning device 65 to provide a visible or audible signal in the event the system pressure drops below 50% of its normal level.

FIGURES 2 and 3, to which detailed reference will now be made, illustrate one of the identical combined service and emergency brake actuator assemblies 24.

This unit comprises a main housing 67 including a cup-shaped portion 68 having a cylindrical extension 70 provided at its open end with threads 72 for attachment to the brake spider or support plate (not shown) in the manner disclosed in the aforementioned Patent No. 3,037,584. The cup-shaped part 68 and the cylindrical part 70 are internally divided by a radial wall 74 providing two pressure chambers 76 and 78 at opposite sides of the wall. Chamber 76 within the cylindrical part 70 contains the main service brake piston 80 having a central rearward threaded stub portion 82 on which is threaded a nut 84 clamping a lock ring 86 against the inner flange of a piston seal 88 to retain the seal on the piston. The front end of the piston is provided with a recess 90 having a semispherical bottom against which the semispherical end of a pushrod 92 abuts. Pushrod 92 is connected to a brake shoe actuating mechanism (not shown) in a manner known per se from the earlier mentioned Patent No. 3,037,584.

An inlet fitting 94 connected in the usual manner with one of the service brake lines 42, 44, 46 and 48 provides the pressure chamber 76 with hydraulic fluid. As is conventional in such systems, chamber 76 may also be provided with a bleeder valve fitting (not shown).

Chamber 78 within the cup structure 68 is also provided with an inlet fitting 96 which extends through the intermediate wall portion 74 and is connected to one of the lines 54, 56 or 58 leading to the emergency system and may also be provided with a bleeder valve fitting (not shown) as is usual. Chamber 78 contains a piston 98 which comprises a radial flange 100 carrying a seal ring 102 and integral piston stem 104 extending through a central aperture 106 in the wall section 74. Aperture 106 is sealed by means of O-rings 108 against leakage between the chambers 76 and 78. The end surface 110 of the stem abuts the stub portions 82 on service brake piston 80 in their normal position.

Rearward travel of the emergency piston 98 is limited by a rim portion 112 of a cup shaped cover 114 which closes the cup structure 68 and thereby completes the emergency brake chamber assembly. Cover 114 has a number of radial flanges 116 through which bolt and nut assemblies 118 extend to attach the cover to the cup structure. The rim portion 112 of the cover 114 is also provided with an external pilot flange 120 to match the internal pilot flange 122 on the cup structure to correctly position the cover on the cup. The internal wall surface of the cover 114 has a number of inwardly extending ridges 124 to define generally cylindrical spaces 126 which receive and contain a corresponding number of individual coil springs 128 compressed between the piston flange 100 and the end wall 130 of the cover. The coil springs 128 are centrally separated by a round plug or boss 132 extending outwardly from the piston flange opposite the piston stem 104. Plug 132 cooperates with the walls of cover 60 to keep the springs in their initial position. Another plug 134 or boss extends inwardly from the inner surface of the endwall 130 to provide central axial alignment for the springs.

Thus, the coil springs 128 are securely nested in the recesses of the cover 114 preventing undue transverse movement of the springs and keeping them separate, without interfering with the free expansion and contraction of the springs.

The coil springs are preferably of identical size and have identical performance characteristics to provide a balance of forces acting on the piston.

The use of a number of separate identical springs substantially increases the spring force which can be developed in an actuator of a given size, or conversely, permits a substantial reduction in the size of the actuator to provide a spring force of a desired value.

The extension 132 of the piston 98 is provided with a threaded bore 136 and the boss 134 is provided with an axial aperture 138 of slightly larger diameter than the bore 136 and co-axial therewith. The threaded bore 136 and aperture 138 are provided to allow insertion of a tool 140 through the cover and attachment thereof to the piston 98 to manually retract the piston and thereby compress the springs 128 between the end wall of the cover and the piston flange. Thus, the cover 114, piston 98 and springs 128 comprise an independent sub-assembly which can be easily detached from and assembled to the service cylinder. Also, the springs may be conveniently compressed which is especially important after an emergency brake application in order to release the brakes so that the vehicle can be moved.

The parts of the service and emergency brake unit are normally in the position as shown in FIGURE 2, that is, the service brake piston 80 and emergency piston 98 are at their rearmost positions with the piston stem 104 of the emergency piston abutting the stub portion 82 of the service brake piston. As long as there is pressure in the accumulator 30 and the valve 60 is in its normal position the emergency piston will be held in its fully retracted position by fluid pressure within chamber 78. The brakes may be applied in the normal manner by actuating the valve 32 which applies fluid pressure to chamber 76 through inlet fitting 94, forcing piston 80 outwardly. The pressurized fluid is prevented from leaking through aperture 106 into the chamber 78 by the seals 108. Thus, during normal application of the service brakes the emergency piston 98 remains in the rearmost position as shown due to sufficient hydraulic pressure in emergency chamber 78.

Under emergency conditions, that is, when hydraulic pressure in the accumulator 30 drops below a predetermined minimum due to leakage in the service brake line when the valve 32 is open or due to failure of the pump 26 or for other reasons, the pressure within emergency chamber 78 likewise drops until the force exerted by the springs 128 overcomes the pressure in chamber 78 and the springs expand forcing the emergency piston 98 forwardly thereby pushing service piston 80 forwardly to apply the brakes. A similar result may be achieved when the valve 60 is moved either manually or automatically to the "park" position thus connecting the chamber 78 to the reservoir 52 through the valve 32. The emergency piston may be subsequently retracted by returning the valve 60 to its normal position.

After an emergency application due to accidental pressure loss the tool 140 may be inserted through aperture 138 and attached to the piston 44 to manually compress the springs 72 and thereby release the brakes so that the vehicle can be moved for repair.

The invention also comprises a vacuum boosted hydraulic brake system for controlling the operation of the service and emergency brakes. This system, which is illustrated in FIGURES 4 and 5, includes the front brake assemblies 20 served by the service line 36 and branch lines 38 and 40 and the rear combined service and emergency brake assemblies 24 which are identical with the corresponding components of FIGURE 1. The principal additional components of the system include a brake operating unit 150 which is of conventional construction, including a brake pedal master cylinder and an auxiliary fluid reservoir having a capacity of some 20 cubic inches in a typical case. The system also includes a conventional vacuum power booster assembly 152 which contains a residual pressure valve conventional in such units. The system is completed by a two position manual control valve 154 and an automatic valve 156 shown separately in FIGURE 5.

The pressure side of the master cylinder is connected to the booster 152 by a line 158 and the outlet side of the booster 152 is connected to the main service brake line 36 by a conduit 160 which is also connected to an inlet fitting 162 in the valve 156 as explained below. The valve 154 in its normal position connects a branch line 163 to the conduit 54, connected to the emergency brake chambers. The valve 154 also includes a check valve preventing flow from the conduit 54 into the conduit 163. Thus, when the valve 154 is in its "park" position, fluid is dumped from the emergency brake chambers into the service line 36 for return to the reservoir in the unit 150 through the conduits 160 and 158. The emergency brake chambers are initially charged by pumping the brake pedal associated with the unit 150 with the valve 154 in its normal position.

The automatic valve 156 comprises an essentially cylindrical body 166 having a threaded bore 168 into which a cover 170 is threaded. A resilient diaphragm assembly 172 is peripherally clamped between the bottom of bore 168 and the inner surface of the cover 170. The chamber 174 at the left side of the diaphragm assembly 172 is connected to the normal service brake line through the opening 162. The diaphragm 172 is supported at one side by a plate 175 and at its opposite side by the cover 170.

The residual pressure valve incorporated in the booster unit 152 maintains a pressure in chamber 174 of 12 p.s.i. to 22 p.s.i. when the operation of the system is normal. This pressure urges a central sealing portion 176 on the diaphragm assembly 172 into sealing contact with the inner end of an inlet port 178 connected by a branch line 180 to the emergency brake pressure line 54. Thus, when the diaphragm is in the position shown in FIGURE 5 the flow of fluid is prevented from the inlet port 178 to an outlet port 182 connected by a line 184 to the master cylinder reservoir.

Assuming that the vehicle has been at rest for some time and that the pressure throughout the system is low, the emergency brakes will be urged to their "on" position by the action of the springs 128. If the valve 154 is moved to its normal position, the necessary emergency brake releasing pressure can be developed in line 54 by repeatedly pumping the brake pedal. This action will also establish a substantial pressure in the valve chamber 174 even if the booster 152 is not in operation. This pressure will be sufficient to maintain the port 178 closed. While the pressure in lines 54 and 180 leading to the port 178 is much higher than the opposing pressure in chamber 174, the area on which the pressure in chamber 174 acts is approximately 80 times as great as the area on which the opposing pressure acts. In a typical cases the dimensions of the unit 156 and the pressures developed in the emergency brake chambers and the main service line are such that the diaphragm assembly will be held in sealing engagement with the port 178 so long as the pressure in chamber 174 is greater than approximately 7 p.s.i. Since the service brake pressure developed in lines 160 and 36 which is communicated to chamber 174, is normally much higher than this when the brakes are in operation and since the booster unit 152 is provided with a valve which normally maintains a residual pressure from 12 p.s.i. to 22 p.s.i., the valve 156 will be held closed under all normal conditions. However, a break or excessive leakage in the main brake service line will immediately be reflected by a reduction in the pressure in chamber 174 to a value substantially below 7 p.s.i. permitting the diaphragm assembly 172 to move to the left establishing communication between the ports 178 and 182 thereby returning the fluid in the emergency brake chambers to the reservoir in the master cylinder unit 150 to permit immediate application of the emergency brakes.

As in the previously described embodiment the emergency brakes may be released by operation of the tool 140.

The invention may be embodied in other specific forms without departing from the spirit of essential characteristics thereof. The present embodiment is therefore to be considered in all respects as illustrative and not restrictive the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A combined emergency and service brake system comprising a brake actuator including a casing having aligned service and emergency chambers separated by a common wall, a first fluid pressure responsive member in said service chamber, said first member having a connection for a brake mechanism, a second fluid pressure responsive member in said emergency chamber, one of said members extending through said wall for operative engagement with the other member, spring means acting on said second fluid pressure responsive member constantly urging each of said members in a brake applying direction, an emergency brake line connected to the space between said wall and said second member for supplying pressure to said space to move said second member in a brake release direction against the action of said spring means, a service brake line connected to the space between the said first member and said wall, a valve for connecting said service brake line to a source of pressure to move said first member in a brake applying direction independently of said second member to apply said brakes or to essentially vent said service brake line to release said brakes, and a manual valve in said emergency brake line for selectively connecting the space between said second member and said wall to said service brake line to permit the movement of each of said members in a brake applying direction under the influence of said spring means.

2. A combined emergency and service hydraulic brake system comprising a brake actuator brake assembly having aligned service and emergency pistons, said service piston being connected to a brake mechanism and being moved in a brake applying direction by the application of hydraulic pressure in a service brake line, spring means for moving said emergency piston in a brake applying direction, said emergency piston being held in a brake releasing position by the application of hydraulic pressure through an emergency brake line, means for developing and maintaining hydraulic pressure in said emergency brake line, means for selectively developing and releasing pressure in said service brake line to apply and release said brakes, means responsive to a break in said service brake line to reduce the pressure in said emergency brake line to permit said pistons to move in a brake applying direction under the influence of said springs and a manual valve for selectively connecting said emergency brake line to said service brake line to selectively permit the application of said brakes under the influence of said spring means when the pressure in said service brake line is released.

3. A combined emergency and service hydraulic brake system comprising a brake actuator assembly having aligned service and emergency pistons, said service piston having a connection to a brake mechanism and being moved in a brake applying direction by the application of hydraulic pressure through a service brake line, spring means for moving said emergency piston in a brake applying direction, said emergency piston being held in a brake releasing position by the application of hydraulic pressure through an emergency brake line, means for developing and maintaining hydraulic pressure in said emergency brake line, means for selectively developing and releasing pressure in said service brake line to apply and release said brakes, said last mentioned means including means for maintaining a residual pressure of predetermined value in said service brake line, a pressure responsive valve in said emergency brake line adapted when opened to vent said emergency brake line, said valve being normally closed by said residual pressure whereby when said residual pressure falls below a predetermined value the pressure in said emergency brake line is reduced to permit the application of said brakes under the influence of said spring means.

4. The brake system according to claim 3, together with a manual valve for selectively connecting said emergency brake line to said service brake line to permit the selective application of said brakes under the influence of said spring means when the pressure in said service brake line is released.

5. A combined emergency and service hydraulic brake system comprising a brake actuator brake assembly having aligned service and emergency pistons, said service piston being connected to a brake mechanism and being moved in a brake applying direction by the application of hydraulic pressure in a service brake line, spring means for moving said emergency piston in a brake applying direction, said emergency piston being held in a brake releasing position by the application of hydraulic pressure through an emergency brake line, means for developing and maintaining hydraulic pressure in said emergency brake line, means for selectively developing and releasing pressure in said service brake line to apply and release said brakes, a manual valve for selectively connecting said emergency brake line to said service brake line to selectively permit the application of said brakes under the influence of said spring means when the pressure in said service line is released, means for maintaining a residual pressure of predetermined value in said service brake line, a pressure responsive valve in said emergency brake line adapted, when opened, to vent said emergency brake line, said valve being normally closed by said residual pressure whereby when said residual pressure falls below a predetermined value the pressure in said emergency brake line is reduced to permit the application of said brakes under the influence of said spring means.

References Cited by the Examiner
UNITED STATES PATENTS

| | | | |
|---|---|---|---|
| 2,484,983 | 10/1949 | Dath | 267—4 |
| 2,556,596 | 6/1951 | Perkins | 92—132 |
| 2,726,090 | 12/1955 | Williams | 92—130 |
| 2,752,008 | 6/1956 | Peterson | 188—106 |
| 2,754,805 | 7/1956 | Beman | 92—63 |
| 2,976,085 | 3/1961 | Grogan | 92—63 |
| 2,992,630 | 7/1961 | Leighton | 92—63 |
| 3,020,094 | 5/1962 | Murty | 303—9 |
| 3,090,359 | 5/1963 | Hoppenstand | 92—63 |
| 3,093,213 | 6/1963 | Limoges | 303—9 |
| 3,107,583 | 10/1963 | Woodward | 92—63 |
| 3,127,818 | 4/1964 | Cruse | 92—63 |
| 3,144,812 | 8/1964 | Rager et al. | 91—170 |
| 3,152,521 | 10/1964 | Cruse | 92—63 |

SAMUEL LEVINE, *Primary Examiner.*

FRED E. ENGELTHALER, *Examiner.*